US011950129B2

(12) United States Patent
Xu (10) Patent No.: US 11,950,129 B2
(45) Date of Patent: Apr. 2, 2024

(54) DEVICE AND METHOD WITH ADAPTIVE TIME-DIVISION MULTIPLEXING THEREOF

(71) Applicant: Suzhou PanKore Integrated Circuit Technology Co. Ltd., Suzhou (CN)

(72) Inventor: XiaoDan Xu, Suzhou (CN)

(73) Assignee: SUZHOU PANKORE INTEGRATED CIRCUIT TECHNOLOGY CO. LTD., Suzhou (CN)

( * ) Notice: Subject to any disclaimer, the term of this patent is extended or adjusted under 35 U.S.C. 154(b) by 138 days.

(21) Appl. No.: 17/472,748

(22) Filed: Sep. 13, 2021

(65) Prior Publication Data

US 2022/0386167 A1 Dec. 1, 2022

(30) Foreign Application Priority Data

May 26, 2021 (CN) .......................... 202110577858.4

(51) Int. Cl.
*H04W 28/02* (2009.01)
*H04L 43/12* (2022.01)
(Continued)

(52) U.S. Cl.
CPC ......... *H04W 28/0278* (2013.01); *H04L 43/12* (2013.01); *H04W 24/02* (2013.01);
(Continued)

(58) Field of Classification Search
CPC ............. H04W 28/0278; H04W 24/02; H04W 28/0231; H04W 28/0289; H04W 72/0446; H04L 43/12
See application file for complete search history.

(56) References Cited

U.S. PATENT DOCUMENTS 5,687,175 A 11/1997 Rochester, Jr. et al.
9,781,735 B2 * 10/2017 Comsa .............. H04W 72/1215
(Continued)

FOREIGN PATENT DOCUMENTS

CN 104202061 A 12/2014
TW 201832508 A 9/2018

OTHER PUBLICATIONS

TW Office Action dated Feb. 16, 2022 in Taiwan application (No. 110124843).
(Continued)

*Primary Examiner* — Christopher M Crutchfield
*Assistant Examiner* — Tito Q Pham
(74) *Attorney, Agent, or Firm* — McClure, Qualey & Rodack, LLP (57) ABSTRACT

Disclosed is a wireless communication device including a communication circuit, a memory and a microprocessor coupled to the memory and the communication circuit. The communication circuit includes a radio frequency circuit and a first communication branch and a second communication branch sharing a frequency band and coupled to the radio frequency circuit. The memory is configured to store a network environment parameter index. The microprocessor is configured to detect a current state of a wireless network in real time based on the network environment parameter index to obtain current wireless network status data; obtain a time division multiplexing parameter according to an optimization goal and the current wireless network status data; and control the first communication branch and the second communication branch by using time division multiplexing according to the time division multiplexing parameter. Thus, spectrum and radio frequency resources can be optimally used.

19 Claims, 5 Drawing Sheets

(51) Int. Cl.
*H04W 24/02* (2009.01)
*H04W 24/08* (2009.01)
*H04W 72/0446* (2023.01)

(52) U.S. Cl.
CPC ....... *H04W 24/08* (2013.01); *H04W 28/0231* (2013.01); *H04W 28/0289* (2013.01); *H04W 72/0446* (2013.01)

(56) References Cited

U.S. PATENT DOCUMENTS

| | | |
|---|---|---|
| 10,368,353 B2 | 7/2019 | Ly et al. |
| 2003/0236837 A1* | 12/2003 | Johnson .............. H04L 67/1001 709/205 |
| 2005/0038946 A1* | 2/2005 | Borden ................... G06F 13/28 710/310 |
| 2012/0230268 A1* | 9/2012 | Marinier .............. H04B 7/0626 370/329 |
| 2012/0239916 A1* | 9/2012 | Malasani .............. H04W 12/50 713/1 |
| 2017/0373819 A1* | 12/2017 | Liu ........................ H04L 5/0028 |
| 2018/0309561 A1* | 10/2018 | Nozawa ................ H04W 72/04 |
| 2020/0351056 A1* | 11/2020 | Oh ....................... H04W 74/006 |
| 2022/0070845 A1* | 3/2022 | Stauffer ................ H04W 16/14 |
| 2022/0224438 A1* | 7/2022 | Park .................. H04W 72/0446 |

OTHER PUBLICATIONS

CN Office Action dated Apr. 25, 2022 in Chinese application No. 202110577858.4.

\* cited by examiner

DEVICE AND METHOD WITH ADAPTIVE TIME-DIVISION MULTIPLEXING THEREOF

CROSS REFERENCE TO RELATED APPLICATION

This application claims the priority benefit of Chinese Patent Application Serial Number 202110577858.4, filed on May 26, 2021, the full disclosure of which is incorporated herein by reference.

BACKGROUND

Technical Field

The present disclosure relates to the technical field of wireless communication, and more particularly to a wireless communication device and an wireless communication method ri adaptive time division multiplexing thereof.

Related Art

With the vigorous development of various wireless communication technologies, the commonly used wireless communication technologies, such as the Narrow Band Internet of Things (NB-IoT), the Wireless Fidelity (WIFI), the Bluetooth and the Zigbee, are emerging in an endless stream. In order to make better use of limited spectrum resources and better reduce costs, solutions for sharing spectrum and radio frequency resources by two or more wireless communication technologies are becoming more and more popular. Since different wireless communication technologies have their own transmission characteristics, the time-division multiplexing is usually used to allocate packets conforming to different wireless communication technology standards to complete data transmission in the corresponding time slots. In other words, at any point in time, only one wireless communication technology can be used for communication.

However, each node in the current wireless communication network does not know the time division multiplexing parameters of other nodes. Therefore, there may be a situation that when the sending node is in the time slot for sending a packet conforming to the wireless communication technology A to the receiving node, the receiving node is in the time slot for receiving a packet conforming to the wireless communication technology B, thereby resulting in the loss of the packet and causing a problem of performance degradation.

In addition, since the fixed time division multiplexing parameters set by the nodes in the current wireless communication network cannot meet the performance and power cons wnption requirements of real-time changes in application scenarios, there is a problem that the best utilization rate for the spectrum resources cannot be achieved.

SUMMARY

The embodiments of the present disclosure provide a wireless communication device and a wireless communication method with adaptive time-division multiplexing thereof, which can effectively solve the problems of the loss of the packet and performance degradation since each node does not know the time-division multiplexing parameters of other nodes, and the problem that the best utilization rate for the spectrum resources cannot be achieved since the fixed time division multiplexing parameters set by the nodes in the current wireless communication network cannot meet the performance and power consumption requirements of real-time changes in application scenarios.

In order to solve the above problems, the present disclosure is implemented as follows.

In a first aspect of the present disclosure, a wireless communication device is provided, which comprises a communication circuit, a memory, and a microprocessor, wherein the microprocessor is coupled to the memory and the communication circuit. The communication circuit includes a first communication branch, a second communication branch, and a radio frequency circuit. The first communication branch and the second communication branch are coupled to the radio frequency circuit, and the first communication branch and the second communication branch share a frequency band. The memory is configured to store a network environment parameter index. The microprocessor is configured to detect a current status of a wireless network in real time based on the network environment parameter index to obtain current network status data, and obtain a time-division multiplexing parameter according to an optimization goal and the current network status data, and control the first communication branch and the second communication branch by using time division multiplexing according to the time division multiplexing parameter.

In a second aspect of the present disclosure, a wireless communication method with adaptive time division multiplexing is provided, which is suitable for a wireless communication device. The wireless communication device includes a first communication branch, a second communication branch, and a radio frequency circuit. The first communication branch and the second communication branch are coupled to the radio frequency circuit, and share a frequency band. The wireless communication method with adaptive time division multiplexing includes the following steps of: storing a network environment parameter index; detecting a current status of a wireless network in real tithe based on the network environment parameter index to obtain current network status data obtaining a time-division multiplexing parameter according to an optimization goal and the current network status data; and controlling the first communication branch and the second communication branch by using time division multiplexing according to the time division multiplexing parameter.

In the embodiments of the present disclosure, the wireless communication device can adaptively modifies the time division multiplexing parameter in real time according to the application scenarios of the current wireless network (that is, the network environment parameter index and the optimization goal) and related data characteristics (that is, the characteristics of the current network status data) to achieve the technical efficacy of the optimal use of spectrum and radio frequency resources, the best performance and the lowest power consumption.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the puipose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 1:
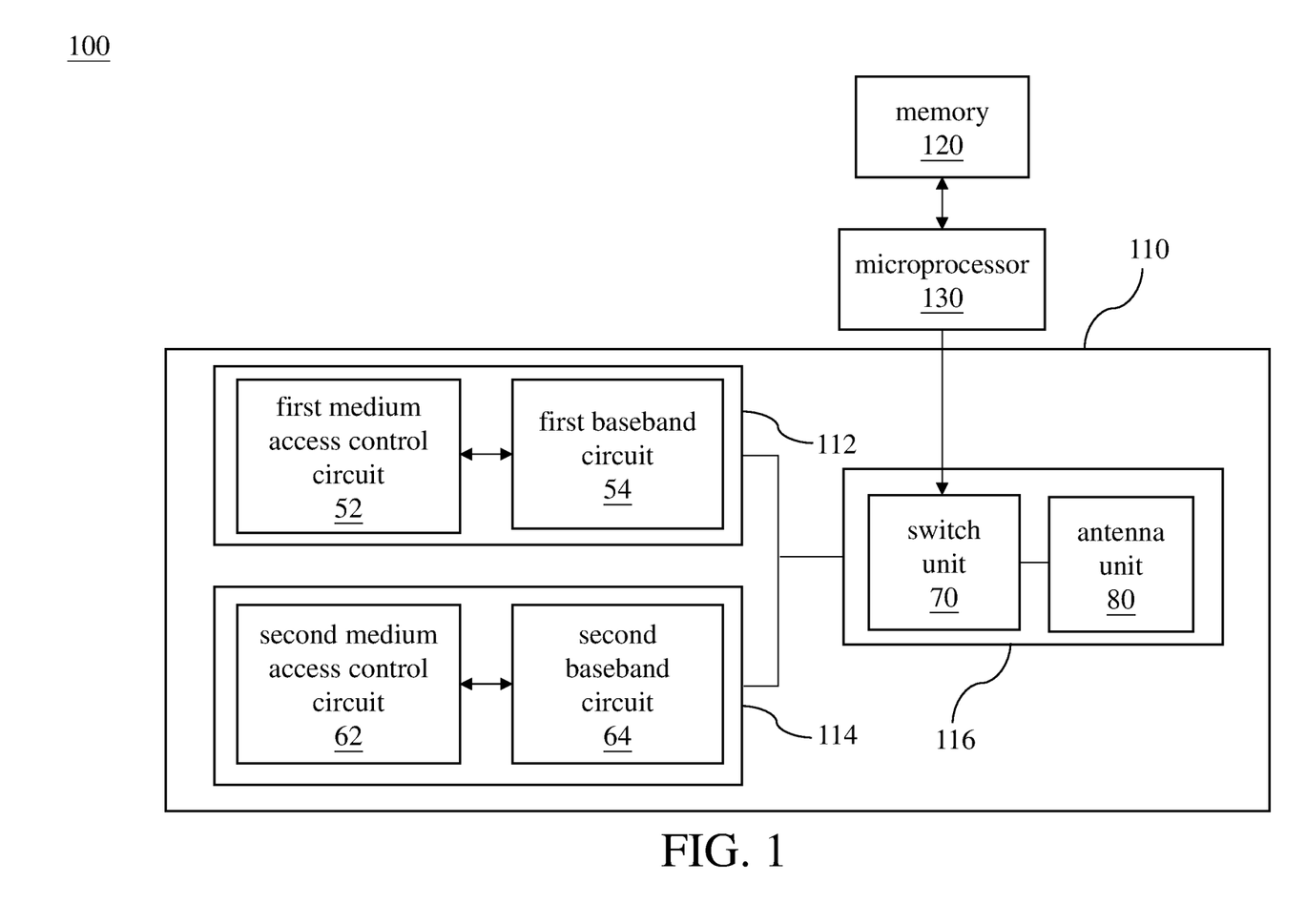
FIG. 1 is a block diagram of a wireless communication device according to an embodiment of the present disclosure.

Please refer to FIG. 1, which is a block diagram of a wireless communication device according to an embodiment of the present disclosure. As shown in FIG. 1, in this embodiment, the wireless communication device 100 comprises a communication circuit 110, a memory 120, and a microprocessor 130. The microprocessor 131) is coupled to the memory 120 and the communication circuit 110, so that the microprocessor 130 can directly control the communication circuit 110.

In this embodiment, the communication circuit 110 comprises a first communication branch 112, a second communication branch 114, and a radio frequency circuit 116. The first communication branch 112 and the second communication branch 114 are coupled to the radio frequency circuit 116, and share a frequency band.

In one embodiment, the first communication branch 112 may adopt the Bluetooth communication technology for communication, the second communication branch 114 may adopt the WIFI communication technology for communication, and the first communication branch 112 and the second communication branch 114 share the frequency band of 2.4 GHz, wherein the frequencies the WIFI and the Bluetooth work on are in the range of 2400 MHz to 2483.5 MHz.

In one embodiment, the first communication branch 112 may comprise a first medium access control (MAC) circuit 52 and a first baseband (BB) circuit 54, and the second communication branch 114 may comprise a second medium access control circuit 62 and a second baseband circuit 64, wherein the first medium access control circuit 52 is coupled to the first baseband circuit 54, and the second medium access control circuit 62 is coupled to the second baseband circuit 64. The first medium access control circuit 52 and the second medium access control circuit 62 are used to control access to the wireless medium. The first baseband circuit 54 and the second baseband circuit 64 are used to process the baseband signals received from the radio frequency circuit 116 and generate baseband signals to be sent by the radio frequency circuit 116. The first communication branch 112 and the second communication branch 114 perform operations, such as encoding/decoding, modulation/demodulation, and multiplexing/demultiplexing based on the adopted wireless communication technology.

In one embodiment, the memory 120 and the microprocessor 130 may be integrated into a system on a chip (SoC). In one embodiment, the microprocessor 130 may be a 32-bit ARM processor, the memory 120 may be a flash memory, and the flash memory may be used to store data, such as network environment parameter indexes, current wireless network status data, and optimization goals, and codes loaded and executed by the microprocessor 130 to implement various applications such as the wireless communication method with adaptive time divisionmultiplexing of the present disclosure. In one embodiment, the first communication branch 112, the second communication branch 114, the memory 120, and the microprocessor 130 may be integrated into an integrated circuit (IC).

In one embodiment, the radio frequency circuit 116 may comprise a switch unit 70 and an antenna unit 80. The switch unit 70 is coupled to the antenna unit 80 and selectively coupled to the first communication branch 112 or the second communication branch 114. The switch unit 70 is used to be switched between being coupled to the first communication branch 112 and the second communication branch 114 according to the time division multiplexing parameter. That is, only the first communication branch 112 or the second communication branch 114 operates at any point in time.

Figure 2:
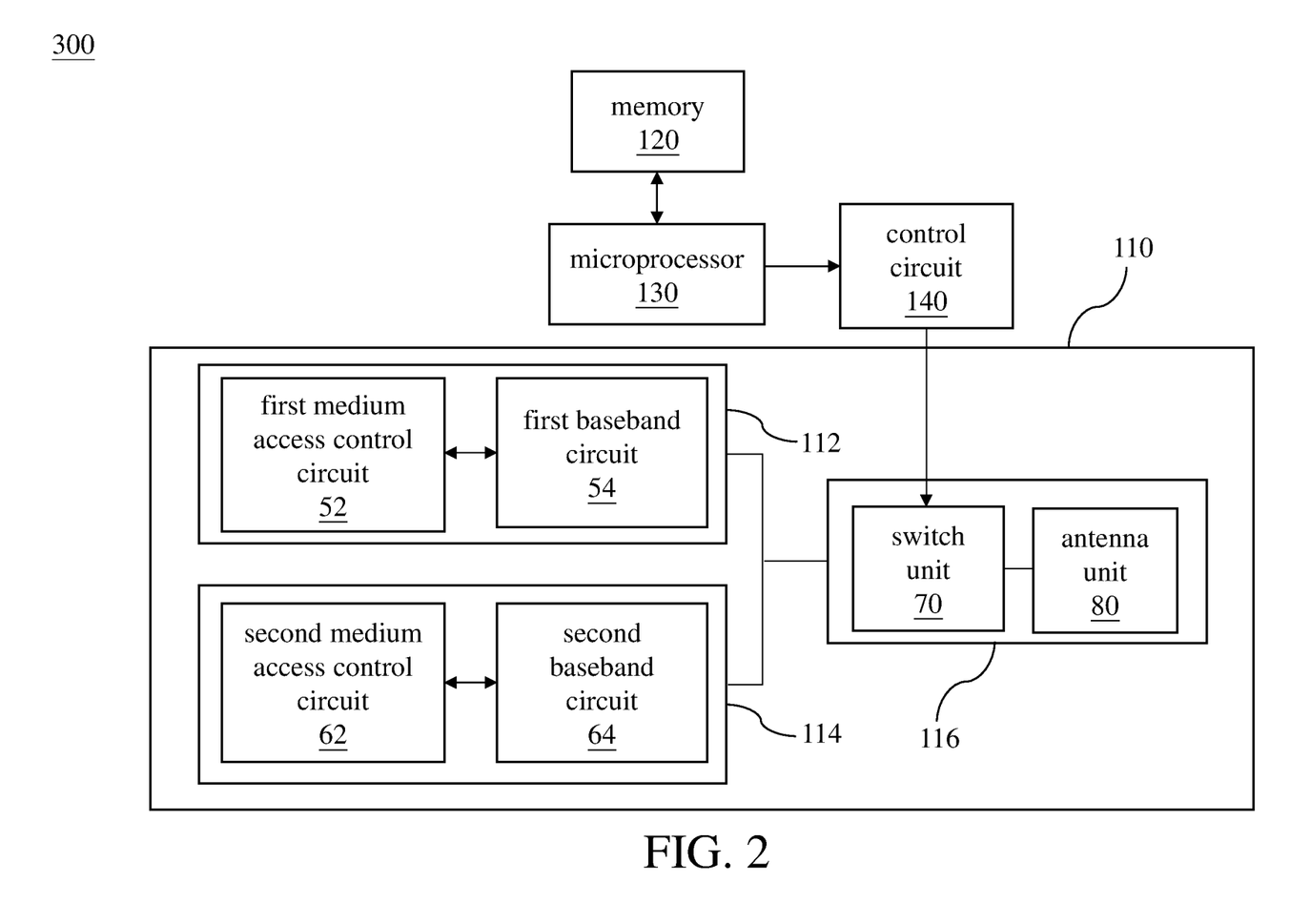
FIG. 2 is a block diagram of a wireless communication device according to another embodiment of the present disclosure.

In one embodiment, please refer to FIG. 2, which is a block diagram of a wireless communication device according to another embodiment of the present disclosure. As shown in FIG. 2, in this embodiment, the difference between the wireless communication device 300 and the wireless communication device 100 of the foregoing embodiment is that the wireless communication device 300 further comprises a control circuit 140, and the microprocessor 130 is coupled to the memory 120. The control circuit 140 is coupled to the microprocessor 130 and the communication circuit 110 so that the microprocessor 130 can indirectly control the communication circuit 110 through the control circuit 140. In one embodiment, the memory 120, the microprocessor 130, and the control circuit 140 may be integrated into a SoC. In one embodiment, the first communication branch 112, the second communication branch 114, the memory 120, the microprocessor 130, and the control circuit 140 may be integrated into an IC.

Figure 3:
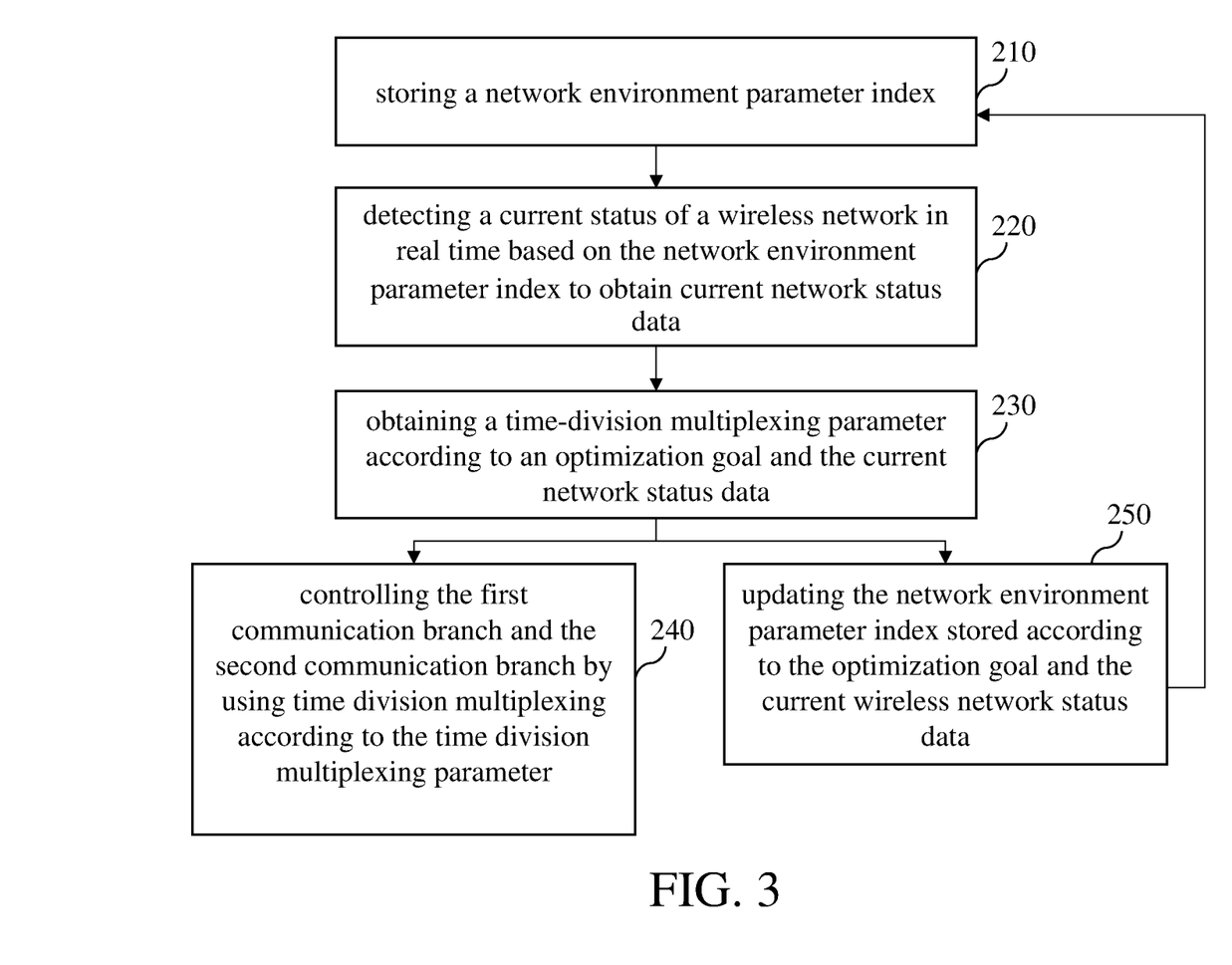
FIG. 3 is a method flowchart of a wireless communication method with adaptive time division multiplexing according to an embodiment of the present disclosure.

Please refer to FIG. 1, FIG. 2 and FIG. 3, wherein FIG. 3 is a method flowchart of a wireless communication method with adaptive time division multiplexing according to an embodiment of the present disclosure. In this embodiment, the wireless communication method with adaptive time division multiplexing can be executed by the wireless communication device 100 in FIG. 1 or the wireless communication device 300 in FIG. 2. The wireless communication method with adaptive time division multiplexing comprises the following steps of storing a network environment parameter index (step 210); detecting a current status of a wireless network in real time based on the network environment parameter index to obtain current wireless network status data (step 220); obtaining a time-division multiplexing parameter according to an optimization goal and the current wireless network status data (step 230); and controlling the radio frequency circuit ter the first co muni cation branch and the second communication branch by using time division multiplexing according to the time division multiplexing parameter (step 240).

In this embodiment, the memory 120 is configured to store the network environment parameter index. The microprocessor 130 is configured to detect a current status of a wireless network in real time based on the network environment parameter index to obtain current wireless network status data, and obtain a time-division multiplexing parameter according to an optimization goal and the current wireless network status data. The microprocessor 130 can directly or indirectly control the radio frequency circuit 116 for the first communication branch 112 and the second communication branch 114 by using time division multiplexing. For example, when the microprocessor 130 indirectly controls the radio frequency circuit 116 for the first communication branth 112 and the second communication branch 114 by using time division multiplexing, the microprocessor 130 sends an instruction to the control circuit 140 to make the control circuit 140 control the radio frequency circuit 116 for the first communication branch 112 and the second communication branch 114 by using time division multiplexing to reduce a workload of the microprocessor 130. In another example, when the microprocessor 130 can perform the aformentioned control function of the control circuit 140, the microprocessor 130 can directly controls the radio frequency circuit 116 for the first communication branch 112 and the second communication branch 114 by using time division multiplexing, and the control circuit 140 can be omitted.

In one embodiment, the network environment parameter index in step 210 comprises the number of nodes in a mesh network and a signal strength of a radio frequency signal from each node in the mesh network, wherein the mesh network and and the first communication branch 112 adopt the same wireless communication technology, or the mesh network and the second communication branch 114 adopt the same wireless communication technology. It should be noted that this embodiment is not intended to limit the scope of the present disclosure, and the actual network environment parameter index can be adjusted according to different application scenarios.

In one embodiment, the current wireless network status data described in step 220 comprises the number of nodes in the current mesh network and/or the signal strength of the radio frequency signal from each node in the current mesh network. It should be noted that this embodiment is not intended to limit the scope of the present disclosure, and the actual current wireless network status data can be adjusted according to different network environment parameter indexes.

In one embodiment, the optimization goal described in step 230 comprises a packet loss rate and/or throughput of a mesh network, wherein the mesh network and the first communication branch 112 adopt the same wireless communication technology, or the mesh network and the second communication branch 114 adopt the same wireless communication technology. It should be noted that this embodiment is not used to limit the scope of the present disclosure, and the actual optimization goal can be adjusted according to actual requirements and/or different application scenarios.

In one embodiment, step 230 comprises: obtaining a threshold corresponding thereto based on the optimization goal and the network environment parameter index; and obtaining the time division multiplexing parameter according to the threshold and the current wireless network status data. The threshold may be adjusted according to the actual requirements and/or different application scenarios. For example, when the optimization goal is a packet loss rate of a mesh network and the network environment parameter index is the number of nodes in the mesh network, the threshold obtained by the microprocessor 130 may be, but is not limited to 3. Next, the microprocessor 130 compares the threshold with the number of nodes in the current mesh network. When the number of nodes in the current mesh network is greater than, less than or equal to the threshold (that is, the number of nodes in the current mesh network is greater than, less than or equal to 3), there are different time division multiplexing parameters obtained corresponding thereto, but this example is not used to limit the scope of the present disclosure. In another example, when the optimization goal is the packet loss rate of the mesh network and the network environment parameter index is the signal strength of the radio frequency signal from each node in the mesh network, the threshold obtained by the microprocessor 130 may be, but is not limited to 4, and the number of nodes with the signal strength greater than a default value in the current mesh network is obtained based on the current wireless network status data, wherein the default value can be adjusted according to actual needs. Next, the microprocessor 130 compares the threshold with the number of nodes with the signal strength greater than the default value in the current mesh network. When the number of nodes with the signal strength greater than the default value in the current mesh network is greater than less than or equal to the threshold (that is, the number of nodes with the signal strength greater than the default value in the current mesh network is greater than, less than or equal to 4), there are different time division multiplexing parameters obtained corresponding thereto. In one embodiment, the optimized time-division multiplexing parameters obtained after actually operating in a plurality of different wireless environments are pre-stored in the memoir 120 to shorten the time for optimization process executed by the microprocessor 130. That is, the time for the microprocessor 130 to obtain the time-division multiplexing parameter is shortened.

In one embodiment, the time division multiplexing parameter described in step 240 comprises time-slot lengths occupied by the first communication branch 112 and the second communication branch 114 and starting positions of time-slot parameters.

In one embodiment, the wireless communication method with adaptive time division multiplexing further comprises the step of updating the network environment parameter index stored according to the optimization goal and the current wireless network status data. (step 250). That is to say, the microprocessor 130 can modify the network environment parameter index according to the optimization goal and the current wireless network status data in real time, and make the memory 120 update the and store the modified network environment parameter index (that is, return to step 220). Therefore, the best spectrum resource utilization rate is achieved when the wireless communication method with adaptive time division multiplexing is subsequently performed.

Figure 4:
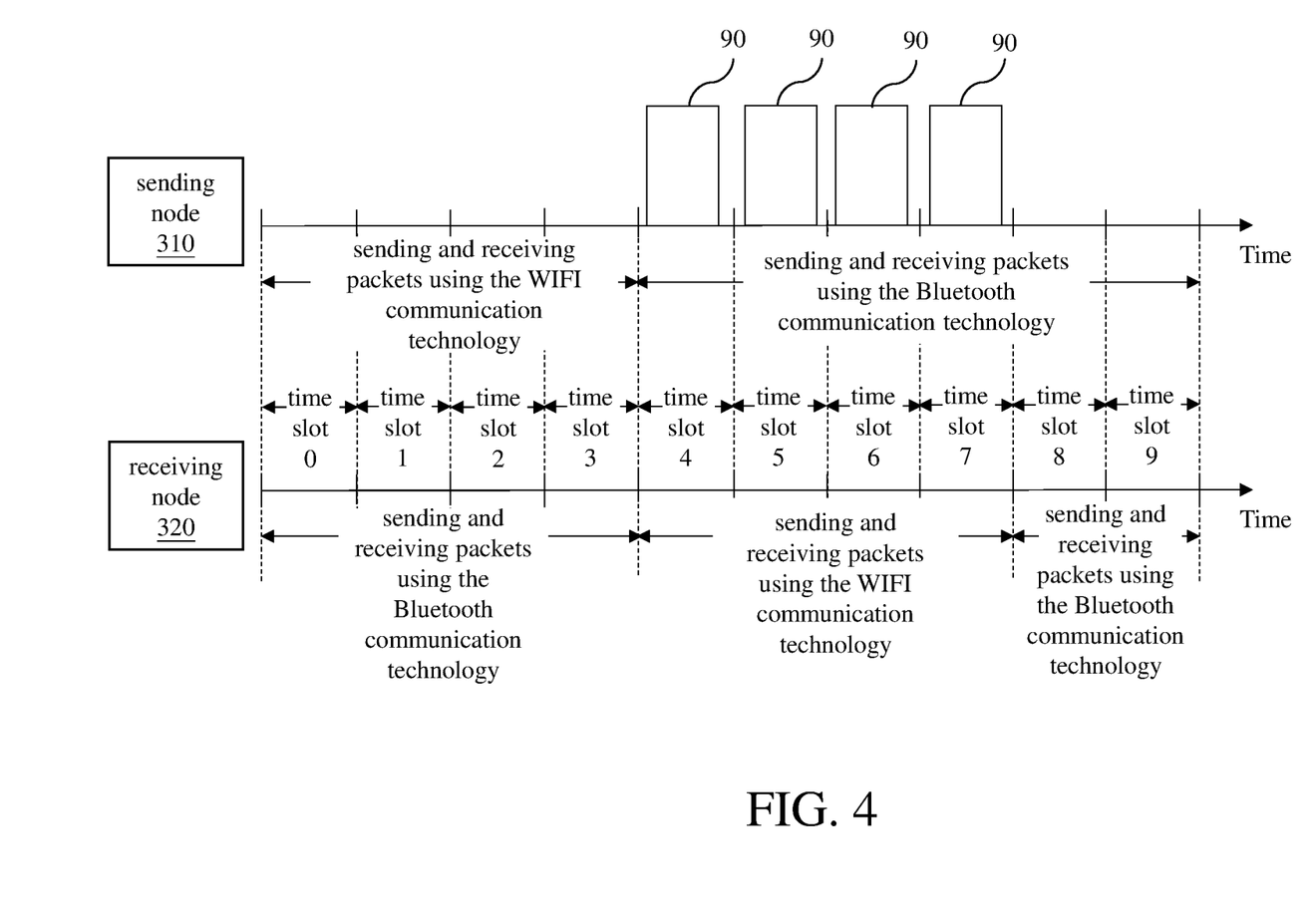
FIG. 4 is a time axis diagram illustrating an embodiment in which a sending node and a receiving node perform Bluetooth packet communication when the sending node and the receiving node are independently set with fixed time division multiplexing parameters.
Figure 5:
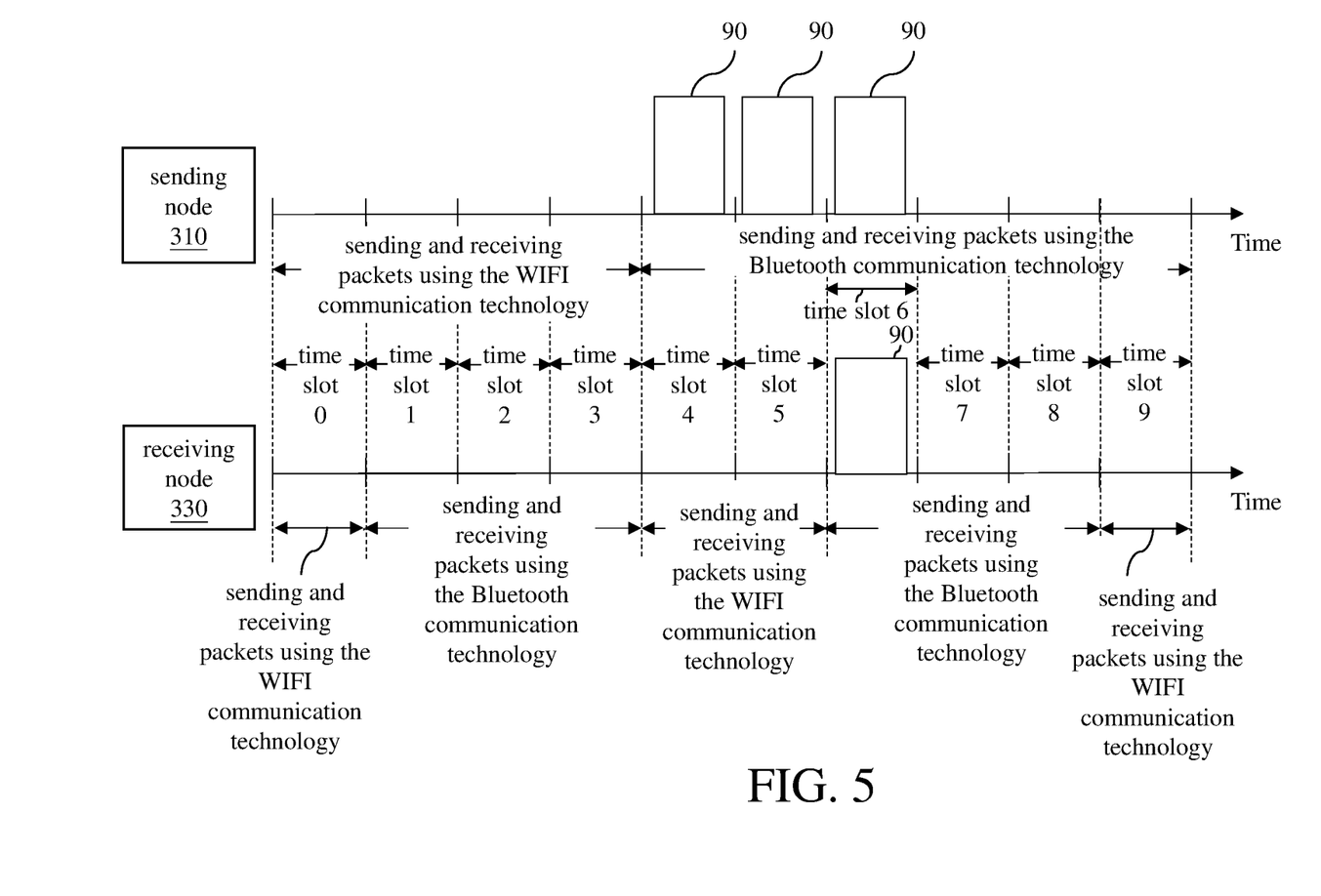
FIG. 5 is a time axis diagram illustrating an embodiment in which a sending node and a receivinc node perform Bluetooth packet communication when the receiving node using the wireless communication method with adaptive time-division multiplexing of the present disclosure to modify the time-division multiplexing parameter in real time.

The following description may be given by way of example in conjunction with FIG. 4 and FIG. 5.

Please refer to FIGs, 4 and 5, wherein FIG. 4 is a time axis diagram illustrating an embodiment in which a sending node and a receiving node perform Bluetooth packet communication when the sending node and the receiving node are independently set with fixed time division multiplexing parameters, and FIG. 5 is a time axis diagram illustrating an embodiment in which a sending node and a receiving node perform Bluetooth packet communication when the receiving node using the wireless communication method with adaptive time-division multiplexing of the present disclosure to modify the time-division multiplexing parameter in real time.

In FIGS. 4 and 5, 1.00 ms is set as a cycle and every 10 ms is set as a time slot. Therefore, 100 ms can be divided into 10 time slots, and the serial numbers of the time slots are from 0 to 9 (that is, time slot 0, time slot 1, time slot 2, time slot 3, time slot 4, time slot 5, time slot 6, time slot 7, time slot 8, and time slot 9).

In FIG. 4, the sending node 310 and the receiving node 320 are existing wireless communication devices and adopt the Bluetooth communication technology and WIFI communication technology, which share one antenna. Therefore, the sending node 310 and the receiving node 320 are independently set with a fixed time division multiplexing parameter. As shown in FIG. 4, in the sending node 310 and the receiving node 320, the proportion of the number of time slots allocated for sending and receiving packets using the Bluetooth communication technology to the number of time slots allocated fir sending and receiving packets using the WIFI communication technology is fixed at 6:4. In the sending node 310, the time slot 0, the time slot 1, the time slot 2 and the time slot 3 are allocated for sending and receiving packets using the WIFI communication technology, and the time slot 4, the time slot 5, the time slot 6, the time slot 7, the time slot 8 and the time slot 9 are allocated for sending and receiving packets using the Bluetooth communication technology. In the receiving node 320, the time slot 4, the time slot 5, the time slot 6 and the time slot 7 are allocated for sending and receiving packets using the Will communication technology, and the time slot 0, the time slot 1, the time slot 2, the time slot 3, the time slot 8 and the time slot 9 are allocated for sending and receiving packets using the Bluetooth communication technology. The process time for the sending node 310 to send a packet 90 is 10 ms (that is, a time slot). When the sending node 310 fails to transmit the packet 90 using the Bluetooth communication technology for the first time, the sending node 310 will send the packet 90 again using the Bluetooth communication technology, and the maximum number of times to resend the packet 90 using the Bluetooth communication technology is three times. In the scenario of FIG. 4, when the sending node 310 sends the packet 90 using the Bluetooth communication technology for the first time in the time slot 4, the receiving node 320 cannot receive the packet 90 since the receiving node 320 is in the time slot 4 for receiving and sending packets using the WIFI communication technology. Even if the sending node 310 can re-send the packet 90 using the Bluetooth communication technology in the time slot 5, the time slot 6, and the time slot 7 respectively, the receiving node 320 still cannot receive the packet 90 since the receiving node 320 is in the time slot 5, the time slot 6 and the time slot 7 for receiving and sending packets using the WIFI communication technology. Thus, there is a situation where the packet 90 is lost.

In FIG. 5, the sending node 310 is an existing wireless communication device, and the receiving node 330 is the above-mentioned wireless communication device 100. The sending node 310 and the receiving node 330 adopt the Bluetooth communication technology and WIFI communication technology, which share one antenna. Therefore, the sending node 310 is set with a fixed time division multiplexing parameter, and the receiving node 330 can adaptively modify the time division multiplexing parameter to effectively reduce the packet loss rate, wherein at this time, the network environment parameter index is the number of nodes in the Bluetooth mesh network, the optimization goal is the packet loss rate of the Bluetooth mesh network, and the time division multiplexing parameter comprises the length of the time slots allocated to receive and send the packet 90 using the Bluetooth communication technology and the starting positions of the time slots. As shown in FIG. 5, in the sending node 310, the proportion of the number of time slots allocated for sending and receiving packets using the Bluetooth communication technology to the number of time slots allocated for sending and receiving packets using the WIFI communication technology is fixed at 6:4, and in the receiving node 330, the proportion of the number of time slots allocated for sending and receiving packets using the Bluetooth communication technology to the number of time slots allocated for sending and receiving packets using the WIFI communication technology can be adaptively adjusted to 3:2:3:2. In the sending node 310, the time slot 0, the time slot 1, the time slot 2 and the time slot 3 are allocated for sending and receiving packets using the WIFI communication technology, and the time slot 4, the time slot 5, the time slat 6, the time slot 7, the time slot 8 and the time slot 9 are allocated for sending and receiving packets using the Bluetooth communication technology. In the receiving node 330, the time slot 4, the time slot 5, the time slot 9 and the time slot 0 are allocated for sending and receiving packets using the WIFI communication technology, and the time slot 1, the time slot 2, the time slot 3, the time slot 6, the time slot 7 and the time slot 8 are allocated for sending and receiving packets using the Bluetooth communication technology. The process time for the sending node 310 to send the packet 90 is 10 ms. When the sending node 310 fails to transmit the packet 90 using the Bluetooth communication technology for the first time, the sending node 310 will send the packet 90 again using the Bluetooth communication technology, and the maximum number of times to resend the packet 90 using the Bluetooth communication technology is three times. In the scenario of FIG. 5, when the sending node 310 sends the packet 90 using the Bluetooth communication technology for the first time in the time slot 4, the receiving node 320 cannot receive the packet 90 since the receiving node 320 is in the time slot 4 for receiving and sending packets using the WIFI communication technology. Nevertheless, the sending node 310 can re-send the packet 90 using the Bluetooth communication technology in the time slot 5 and the time slot 6, so that the receiving node 330 can receive the packet 90 using the Bluetooth communication technology in the time slot 6. Thus, the packet 90 is not lost. It should be noted that since the receiving node 330 can receive the packet 90 using the Bluetooth communication technology in the time slot 6, the sending node 310 does not re-send the packet 90 using the Bluetooth communication technology in the time slot 7, but may transmit the next packet using the Bluetooth communication technology.

It can be seen from the above examples in FIGS. 4 and 5 that the receiving node 330 can adaptively modify the time-division multiplexing parameter due to the application of the wireless communication method with adaptive time-division multiplexing of the present disclosure, thereby avoiding the loss of the packet 90, and effectively reducing the packet loss rate.

In summary, the wireless communication device and the wireless communication method with adaptive time-division multiplexing thereof according to the embodiments of the present disclosure can adaptively modifies the time division multiplexing parameter in real time according to the application scenarios of the current wireless network (that is, the network environment parameter index and the optimization goal) and related data characteristics (that is, the characteristics of the current wireless network status data) to achieve the technical efficacy of the optimal use of spectrum and radio frequency resources, the best performance and the lowest power consumption. In addition, the wireless communication device and the wireless communication method with adaptive time-division multiplexing thereof of the embodiments of the present disclosure can also modify the network environment parameter index according to the optimization goal in real time, so as to be suitable for different application scenarios.

It is to be understood that the term "comprises", "comprising", or any other variants thereof, is intended to encompass anon-exclusive inclusion, such that a process, method, article, or device of a series of elements not only comprise those elements hut also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A wireless communication device, comprising:
a communication circuit, comprising a first communication branch, a second communication branch, and a radio frequency circuit, wherein the first communication branch and the second communication branch are coupled to the radio frequency circuit, share a frequency band, and adopt different wireless communication technologies for communication, and the different wireless communication technologies comprise a Bluetooth communication technology and a WIFI communication technology;
a memory, configured to store a network environment parameter index; and
a microprocessor, coupled to the memory and the communication circuit, configured to detect a current status of a wireless network in real time based on the network environment parameter index to obtain current network status data; obtain a time-division multiplexing parameter according to an optimization goal and the current network status data; and control the first communication branch and the second communication branch by using time division multiplexing according to the time division multiplexing parameter.

2. The wireless communication device according to claim 1, wherein the microprocessor is further configured to update the network environment parameter index stored in the memory according to the optimization goal and the current network status data.

3. The wireless communication device according to claim 1, wherein the network environment parameter index comprises the number of nodes in a mesh network and a signal strength of a radio frequency signal from each node in the mesh network.

4. The wireless communication device according to claim 3, wherein the mesh network and the first communication branch adopt the same wireless communication technology, or the mesh network and the second communication branch adopt the same wireless communication technology.

5. The wireless communication device according to claim 1, wherein the optimization goal comprises a packet loss rate and throughput of a mesh network.

6. The wireless communication device according to claim 1, wherein the microprocessor obtains a threshold corresponding thereto based on the optimization goal and the network environment parameter index, and obtains the time division multiplexing parameter according to the threshold and the current network status data.

7. The wireless communication device according to claim 1, wherein the time division multiplexing parameter comprises time-slot lengths occupied by the first communication branch and the second communication branch and starting positions of time-slot parameters.

8. The wireless communication device according to claim 1, further comprising a control circuit, wherein the control circuit is coupled to and between the microprocessor and the communication circuit, and is configured to receive instructions from the microprocessor and control the first communication branch and the second communication branch by using time division multiplexing according to the time division multiplexing parameter to reduce a workload of the microprocessor.

9. The wireless communication device according to claim 1, wherein the memory pre-stores optimized time-division multiplexing parameters obtained after operating in a plurality of different wireless environments, so as to shorten the time for the microprocessor to obtain the time-division multiplexing parameter.

10. The wireless communication device according to claim 1, wherein both the first communication branch and the second communication branch are configured for sending and receiving packets.

11. A wireless communication method with adaptive time division multiplexing, applicable to a wireless communication device, which comprises a radio frequency circuit, a first communication branch and a second communication branch coupled to the radio frequency circuit, sharing a frequency band and adopting different wireless communication technologies for communication, and the different wireless communication technologies comprising a Bluetooth communication technology and a WIFI communication technology, the wireless communication method with adaptive time division multiplexing comprising the following steps of:
storing a network environment parameter index;
detecting a current status of a wireless network in real time based on the network environment parameter index to obtain current network status data;
obtaining a time-division multiplexing parameter according to an optimization goal and the current network status data; and
controlling the first communication branch and the second communication branch by using time division multiplexing according to the time division multiplexing parameter.

12. The wireless communication method according to claim 11, further comprising:
updating the network environment parameter index stored according to the optimization goal and the current network status data.

13. The wireless communication method according to claim 11, wherein the step of obtaining the time-division multiplexing parameter according to the optimization goal and the current network status data comprises:
obtaining a threshold corresponding thereto based on the optimization goal and the network environment parameter index; and
obtaining the time division multiplexing parameter according to the threshold and the current network status data.

14. The wireless communication method according to claim 11, wherein the network environment parameter index comprises the number of nodes in a mesh network and a signal strength of a radio frequency signal from each node in the mesh network.

15. The wireless communication method according to claim 14, wherein the mesh network and the first communication branch adopt the same wireless communication technology, or the mesh network and the second communication branch adopt the same wireless communication technology.

16. The wireless communication method according to claim 11, wherein the optimization goal comprises a packet loss rate and throughput of a mesh network.

17. The wireless communication method according to claim 11, wherein the time division multiplexing parameter comprises time-slot lengths occupied by the first communication branch and the second communication branch and starting positions of time-slot parameters.

18. The wireless communication method according to claim 11, further comprising:
receiving instructions from a microprocessor and controlling the first communication branch and the second communication branch by using time division multiplexing according to the time division multiplexing parameter.

19. The wireless communication method according to claim 11, further comprising:
pre-storing optimized time-division multiplexing parameters obtained after operating in a plurality of different wireless environments, so as to shorten the time to obtain the time-division multiplexing parameter.

* * * * *